United States Patent
Farzana et al.

(10) Patent No.: US 8,118,910 B2
(45) Date of Patent: Feb. 21, 2012

(54) LAYERED FILTRATION MEMBRANE AND METHODS OF MAKING SAME

(75) Inventors: Nusrat Farzana, Lee's Summit, MO (US); David Kazemi, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 12/409,137

(22) Filed: Mar. 23, 2009

(65) Prior Publication Data

US 2010/0236410 A1 Sep. 23, 2010

(51) Int. Cl.
  B01D 67/00 (2006.01)
  B01D 39/16 (2006.01)
  B01D 46/00 (2006.01)
  B01D 46/04 (2006.01)

(52) U.S. Cl. .......... 95/45; 95/273; 95/279; 95/285; 96/11; 96/12; 55/302; 55/385.4; 55/487; 55/524; 55/DIG. 5; 210/490; 210/500.27; 156/77; 156/229; 156/244.11

(58) Field of Classification Search .......... 96/4, 11, 96/12; 95/45, 52, 273, 279, 285; 55/302, 55/385.1, 385.3, 385.4, 486, 487, 524, DIG. 5; 210/490, 650, 500.27; 156/77, 229, 244.11
See application file for complete search history.

(56) References Cited

U.S. PATENT DOCUMENTS

| | | | |
|---|---|---|---|
| 3,573,158 A | 3/1971 | Pall et al. | |
| 3,953,566 A | 4/1976 | Gore | |
| 4,969,998 A | 11/1990 | Henn | |
| 5,116,650 A * | 5/1992 | Bowser | 55/524 |
| 5,462,586 A | 10/1995 | Sugiyama et al. | |
| 5,938,818 A * | 8/1999 | Miller | 55/302 |
| 6,030,428 A * | 2/2000 | Ishino et al. | 55/486 |
| 6,214,093 B1 * | 4/2001 | Nabata et al. | 96/11 |
| 6,228,477 B1 | 5/2001 | Klare et al. | |
| 7,166,024 B2 * | 1/2007 | Mashiko et al. | 55/385.4 |
| 7,306,729 B2 * | 12/2007 | Bacino et al. | 96/4 |
| 2002/0045041 A1 | 4/2002 | Dillon et al. | |
| 2004/0059717 A1 | 3/2004 | Klare et al. | |
| 2009/0061205 A1 * | 3/2009 | Hokazono et al. | 156/229 |
| 2009/0250119 A1 * | 10/2009 | Whelan | 137/197 |
| 2010/0269464 A1 * | 10/2010 | Mori et al. | 55/486 |

OTHER PUBLICATIONS

Hao et al.; Studies on Porous and Morphological Structures of Expanded PTFE Membrane Through Biaxial Stretching Technique; INJ Summer 2005; Original Paper/ Peer-Reviewed; pp. 31-38.

Guo et al.; A Novel Process for Preparing Expanded Polytetrafluoroethylene (ePTFE) Micro-Porous Membrane through ePTFE/ePTFE Co-Stretching Techniques; Journal of Material Science (2007).

BHA PulsePleat Pleated Filter Elements; website http://www.gepower.com/prod_serv/products/particulate_matter/en/ffp/bha_pulse_pleat/index.htm; GE Energy, 1997-2008.

STS Spiro Tube Filters; website http://www.gepower.com/prod_serv/products/particulate_matter/en/ffp/bha_pulse_pleat/sts/index.htm; GE Energy, 1997-2008.

(Continued)

Primary Examiner — Jason M Greene
(74) Attorney, Agent, or Firm — Fletcher Yoder PC

(57) ABSTRACT

A layered filter membrane with improved anti-clogging characteristics is provided. In one embodiment, a filter membrane includes multiple polymer layers, each with different pore diameters formed by stretching the polymer layers. Furthermore, the multiple filter layers are coupled together before being stretched and the different pore sizes are formed during co-stretching of the filter layers.

20 Claims, 4 Drawing Sheets

OTHER PUBLICATIONS

BHA-TEX ePTFE Membrane; website http://www.gepower.com/prod_serv/products/particulate_matter/en/ffp/bha_tex_membrane/index.htm; GE Energy, 1997-2008.

Benefits of Surface vs. Depth Filtration; website http://www.gepower.com/prod_serv/products/particulate_matter/en/ffp/bha_tex_membrane/ben.htm; GE Energy, 1997-2008.

Moisture Problem Prevention; website http://www.gepower.com/prod_serv/products/particulate_matter/en/ffp/bha_tex_membrane/mois.htm; GE Energy, 1997-2008.

Industry-Specific Applications; website http:www.gepower.com/prod_serv/products/particulate_matter/en/ffp/bha_tex_membrane/industry.htm; GE Energy, 1997-2008.

Fabric Options; website http://www.gepower.com/prod_serv/products/particulate_matter/en/ffp/bha_tex_membrane/fabric.htm; GE Energy, 1997-2008.

Manufacturing Quality and Innovation; website http://www.gepower.com/prod_serv/products/particulate_matter/en/ffp/bha_tex_membrane/manufact.htm; GE Energy, 1997-2008.

* cited by examiner

LAYERED FILTRATION MEMBRANE AND METHODS OF MAKING SAME

BACKGROUND OF THE INVENTION

The subject matter disclosed herein relates to filtration membranes.

Filtration membranes are used in a wide range of applications. In general, filtration membranes provide a barrier to contaminants while allowing other desired substances to pass through the membrane. For example, the filtration membranes may block flow of dust and other contaminants, while allowing air and moisture to pass through the membranes. Unfortunately, exposure to certain contamination environments can cause clogging of the filtration membranes, which may reduce the airflow performance of the membranes over time.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes bonding a plurality of layers and co-stretching the plurality of layers, after bonding, to form a filter membrane having porosities that change from one layer to another.

In a second embodiment, a method includes preparing a first polymer mixture configured to provide a first pore size, preparing a second polymer mixture configured to provide a second pore size, and extruding the first polymer mixture into a first billet and extruding the second polymer mixture into a second billet.

In a third embodiment, a method includes filtering a substance in a medium flowing through a stretched filter membrane having a plurality of co-stretched layers with different pore sizes.

In a forth embodiment, a filter membrane includes a first porous polymer layer comprising a first plurality of pores with a first average pore diameter, a second porous polymer layer comprising a second plurality of pores with a second average pore diameter different than the first average pore diameter, and a transition layer co-stretched between the first and second porous polymer layers, wherein the transition layer is configured to block a flow of contaminants between the first and second porous polymer layers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
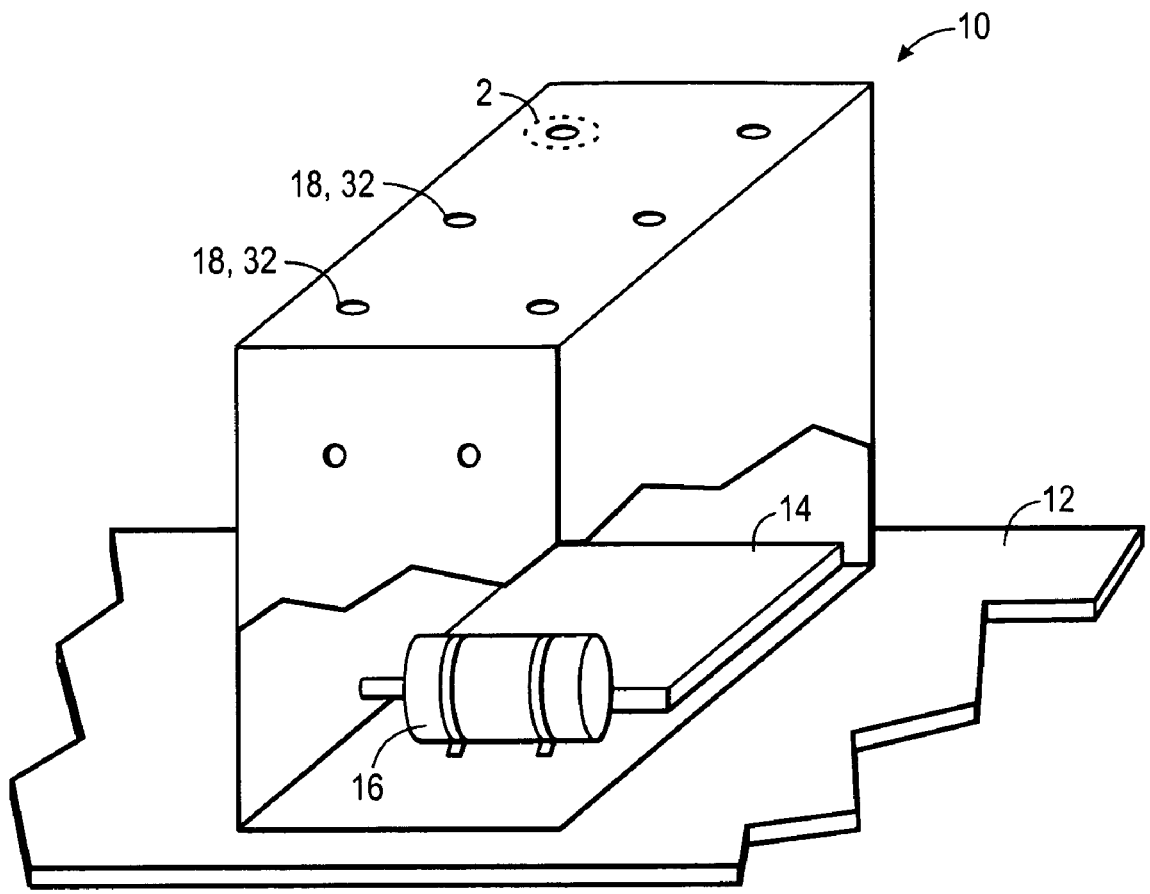
FIG. 1 is a perspective view of a protective enclosure that includes one or more vents with an improved filter membrane in accordance with certain embodiments of the invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention relate to a multi-layer filter membrane with improved anti-clogging characteristics that may be used in micro-venting applications. Micro-vents are low flow-volume vents that use a permeable membrane for providing a barrier to contaminants while allowing other desired substances to pass through the membrane. Micro-vents may be used in enclosures that house sensitive electromechanical equipment or units. The enclosure protects the electronics from dust and other contaminants, while the micro-vent allows air and moisture to pass through, thereby preventing a pressure or temperature buildup inside the enclosure. In some embodiments, a multi-layer filter membrane, in accordance with embodiments, may be fabricated by jointly stretching or expanding a plurality of layers of polytetrafluoroethylene (PTFE) to create a web-like mesh of microscopic pores in each PTFE layer. Each layer of the resulting multi-layer membrane may be referred to as expanded PTFE (ePTFE). ePTFE is particularly useful as a filtration membrane for a wide variety of applications because it is chemically inert and thermally stable. Furthermore, the multi-layer filter membrane may include at least two layers, each with different pore sizes. For example, the filter membrane may include 2, 3, 4, 5, 6, 7, 8, 9, 10, or more layers of the same or different polymeric porous layers with different pore sizes, arrangements, angles, and so forth. The pores may progressively change in average diameter from one layer to another, e.g., 10, 20, 30, 40, 50, 60, 70, 80, 90, or 100 percent change.

In addition, a transition layer or interface may exist between adjacent layers to block the flow of contaminants from one layer to another. For example, transition layer may represent a misalignment of the pores between the adjacent layers, e.g., at least approximately 10, 20, 30, 40, 50, 60, or 70 percent misalignment. In other words, the misalignment may be described as a partial, but not complete, overlap of the pores between the adjacent layers. For example, less than approximately 30, 40, 50, or 60 percent of the cross-sectional area of a pore in one layer may overlap with a corresponding pore in the adjacent layer. Thus, the misalignment may cause a change in flow direction, restriction in flow, and the like, to block contaminants from completely passing through from the layer with large pores to the adjacent layer with small pores. The transition layer may be a direct thermal or chemical bond between the adjacent layers, a thin layer with pores, or any suitable configuration to block flow between the adjacent layers.

The contaminants may include particulate, chemicals, oils, fuels, engine exhaust, or other undesirable solids, liquids, or gases. As discussed below, the filter membrane may have a dirty side and a clean side corresponding to the filter layer with large pores and the filter layer with small pores, respectively. In certain embodiments, the dirty side with large pores may be positioned external to an enclosure housing electronics, drives, motors, or other equipment, while the clean side with small pores may be positioned internal to the enclosure. Accordingly, any contaminants that begin to clog the dirty side of the membrane may be more easily expelled from the pores when air is diffused or passed from the clean side to the dirty side.

As discussed in detail below, the filter member may be formed by stretching materials alone or in combination with one another. For example, a plurality of sheets may be co-stretched (e.g., simultaneously stretched after bonding) to simultaneously create the plurality of layers with different pore sizes. The starting sheets may be the same or different materials. However, after stretching the sheets, the resulting pore sizes and arrangements may be significantly different as discussed in detail below. For example, the starting sheets may be made with the same materials after different processing steps, e.g., application of pressure, heat, mixing, and so forth. By further example, the starting sheets may be made with different mixtures of materials, e.g., a base material with different additives, agents, and solvents. These additives, agents, and solvents may or may not remain in the final multi-layer membrane. In certain embodiments, the amount of additives, agents, and solvents in each mixture may at least partially control the final properties, e.g., porosity, of each layer in the multi-layer membrane. For example, the different mixtures may have PTFE as a base material, which is mixed with different amounts of lube agents or lubricating agent.

FIG. 1 is a perspective view of a protective enclosure that includes one or more vents 18 with the improved filter membrane 32 in accordance with certain embodiments of the invention. As discussed in detail below, the filter membrane 32 may include plurality of layers with different pore sizes formed by a stretching technique with material, such as ePTFE. The enclosure 10 is coupled to a mounting plate 12 and protects equipment such as electronics from exposure to harmful contaminants such as oil, dirt, acid or other chemicals. In some embodiments, the enclosure 10 may be used in an engine compartment of an automobile to house automotive components, such as automotive electronics 14 or a windshield wiper motor 16, for example. The enclosure 10 may also be used to protect a variety of electromechanical devices in commercial, industrial, and consumer applications. For example, the enclosure 10 may protect devices in vehicles, such as automotive or aircraft. The enclosure 10 may contain motors, motor housings, microelectronics, circuit boards, memory, hard drives, processors, control units, sensors, GPS units, alarm units, vehicle black boxes, vehicle lamps (e.g., head lamp, tail tamp, etc.), or other electromechanical units. To block moisture from collecting in the enclosure 10, the enclosure 10 may include one or more vents 18, in accordance with embodiments. The vents 18 allow air and moisture to pass through the enclosure 10, while blocking oil, dust, or other contaminants from entering the enclosure 10. Line 2-2 shows the location of a close-up view of one of the vents 18 illustrated in FIG. 2.

Figure 2:
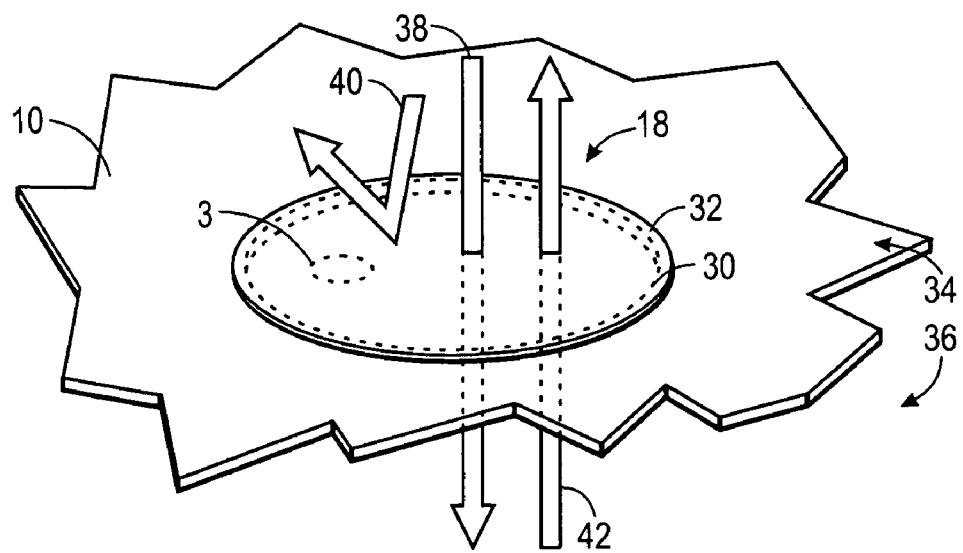
FIG. 2 is a perspective view of an embodiment of one of the vents of FIG. 1.

FIG. 2 is a perspective view of an embodiment of one of the vents 18 of FIG. 1. The vent 18 includes an opening 30 in the enclosure 10, over which a filter membrane 32 is placed. As discussed below, the filter membrane 32 may include several layers of different porosity. The filter membrane 32 may be held in position over the opening 30 with a layer of adhesive around the perimeter of the filter membrane 32. It can also be heat welded, laser welded or insert molded over the opening. As discussed above, the vent 18 allows the enclosure 10 to breathe (e.g., flow air in and out of the enclosure 10) while keeping contaminants out of the enclosure 10. For purposes of the present disclosure, the "dirty" side 34 of the vent 18 or filter membrane 32 is the side that is exposed to contaminants that may be present in the external environment outside of the enclosure 10, while the "clean" side 36 of the vent 18 or filter membrane 32 is the side that faces the internal space within the enclosure 10 where the protected components are housed.

As environmental conditions around the enclosure 10 vary, the temperature inside the enclosure 10 may rise or fall. When the temperature falls, the pressure inside the enclosure 10 may become slightly negative. To equalize the negative pressure, air from the outside enters the enclosure 10 through the filter membrane 32 as indicated by arrow 38. The filter membrane 32 allows air to pass through the vent 18 while blocking contaminants such as dust, dirt, oil, fuel, acid, or other materials, as indicated by arrow 40. When the temperature rises, the pressure inside the enclosure 10 may become slightly positive. To equalize the positive pressure, air from inside the enclosure 10 exits through the filter membrane 32 as indicated by arrow 42. In certain embodiments, the filter membrane also allows moisture to escape as indicated by arrow 42. In this way, the filter membrane 32 allows the pressure inside the enclosure 10 to equalize and allows moisture to escape, while also blocking contaminants from entering the enclosure 10. Line 3-3 shows the location of a close-up view of the filter membrane 32 as shown in FIG. 3.

Figure 3:
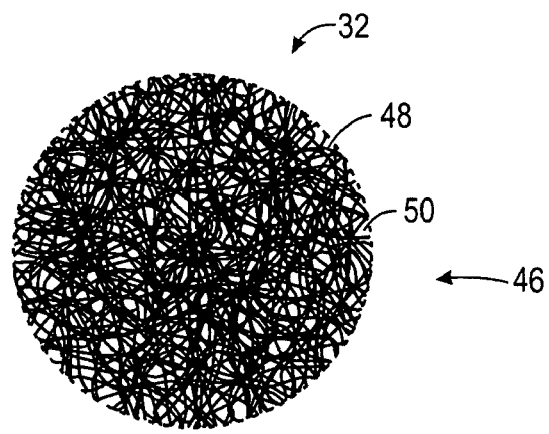
FIG. 3 is a top close-up view of an embodiment of the filter membrane of FIGS. 1 and 2.

FIG. 3 is a close-up top view of an embodiment of the filter membrane 32 of FIGS. 1 and 2. As shown in FIG. 3, the filter membrane 32 may include a mesh 46 of PTFE fibers 48 with voids or pores 50 between the fibers 48. As will be discussed further below, the fiber mesh 46 shown in FIG. 3 may be fabricated by forming one or more layers of PTFE and stretching the layers of PTFE to separate the fibers 48 and open the pores 50, thus forming ePTFE. Accordingly, it will be appreciated that the size of the pores 50 may be determined, at least in part, by the degree to which the PTFE layer is stretched. Additionally, although not shown in FIG. 3, the filter membrane 32 may include two or more ePTFE layers with different pore sizes. For example, the PTFE mixtures used to form the ePTFE layers may different so that, as will be explained further below, the same degree of stretching will produce different pore sizes in the different layers. Other aspects of the filter membrane 32 may be better understood with reference to FIG. 4.

Figure 4:
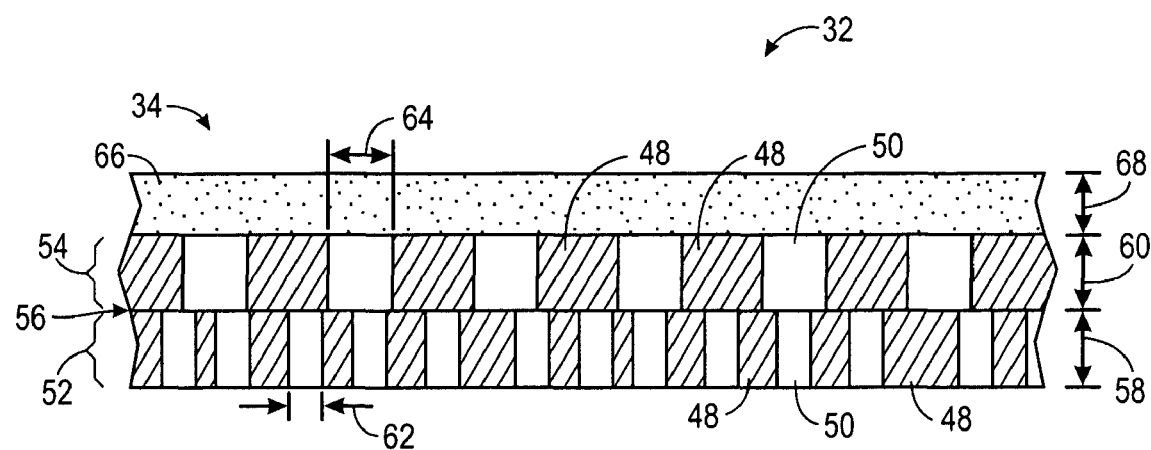
FIG. 4 is a cross-sectional view of an embodiment of a filter membrane with two polymer layers.

FIG. 4 is a cross section of an embodiment of the filter membrane 32 of FIGS. 1-3 with two ePTFE layers 52 and 54. As shown in FIG. 4, the filter membrane 32 may include a bottom layer 52 facing the clean side 36 of the filter membrane 32, a top layer 54 facing the dirty side 34 of the filter membrane 32, and a transition layer 56 that forms an interface between the bottom layer 52 and the top layer 54. A thickness 58 of the bottom layer 52 and a thickness 60 of the top layer 54 may both be at least less than approximately 0.5, 1, 2, 3, 4, 5, 6, 7, 8, 9, 10 or 25 mils. As appreciated, a mil is one thousandth of an inch (i.e., 0.001 inch). In certain embodiments, the thicknesses 58 and 60 may range between approximately 1 to 4 mils (i.e., 0.001 to 0.004 inch). These thicknesses 58 and 60 may be the same or different from one another. For example, the thickness 58 and be approximately 10, 20, 30, 40, 50, 60, 70, 80, or 90 percent of the thickness 60. Additionally, the filter membrane 32 may include any number of layers, e.g., 2, 3, 4, 5, 6, 7, 8, 9, or 10. Furthermore, in alternate embodiments, the top layer 54 may face the clean side 36 of the filter membrane 32, and the bottom layer 52 may face the dirty side 34 of the filter membrane 32.

Also shown in FIG. 4 are the pores 50, which, in some embodiments, may range in diameter from approximately 0.01 to 10, 0.01 to 5, 0.01 to 3.0, or 0.01 to 1.0 microns. As appreciated, a micron is one millionth of a meter. Moreover, an average diameter 62 of the pores 50 in the bottom layer 52 may be smaller than an average diameter 64 of the pores 50 in the top layer 54. For example, the average diameter 62 of the pores 50 in the top layer 54 may be approximately 0.05 to 1.0 microns larger than the average diameter 64 of the pores 50 in the bottom layer 52. In one embodiment, the average diameter 62 of the pores 50 in the bottom layer 52 may be approximately 0.15 to 0.25 microns, while the average diameter 64 of the pores 50 of the top layer 54 may be approximately 0.25 to 0.35 microns. In another embodiment, the average diameter 62 of the pores 50 in the bottom layer 52 may be less than approximately 0.2 microns, and the average diameter 64 of the pores 50 of the top layer 54 may be greater than approximately 0.8 microns. In some embodiments, the average diameter 62 of the pores 50 in the bottom layer 52 may be at least less than approximately 10, 20, 30, 40, 50, 60, 70, or 80 percent of the average diameter 64 of the pores 50 of the top layer 54, wherein the pores 50 of both layers 52 and 54 may be less than approximately 1, 2, 3, 4, 5, 6, 7, 8, 9, or 10 microns. For example, the average diameter 62 of the pores 50 in the bottom layer 52 may be at least less than approximately 50 percent of the average diameter 64 of the pores 50 of the top layer 54, wherein the pores 50 of both layers 52 and 54 may be less than approximately 10 microns. In some embodiments, the filter membrane 32 may include more than two layers, each with progressively smaller pores.

The bottom layer 52 and the top layer 54 are coupled together at the transition layer 56. As will be described further below, the bottom layer 52 and the top layer 54 may be coupled to one another through heating and compression. Moreover, the bottom layer 52 and the top layer 54 may be co-stretched, i.e., coupled together and then stretched at the same time to form the pores 50. As a result of the different pore 50 sizes in the bottom layer 52 and the top layer 54, the pores 50 in the bottom layer 52 and the pores 50 in the top layer 54 will generally not be aligned with one another at the transition layer 56. Thus, the transition layer 56 may provide a region of resistance to the flow of contaminants, as will be described further below with reference to FIGS. 5 and 6. For example, the transition layer 56 represents a directional change and cross-sectional area change for the flow through the filter membrane 32.

The filter membrane 32 may also include a substrate layer 66 that serves to provide improved durability of the filter membrane 32. The substrate layer 66 strengthens the filter membrane 32 without significantly altering the filtering properties provided by the bottom and top ePTFE layers 52 and 54. The substrate layer 66 may include any durable, flexible material that provides a high permittivity, such as polyester, for example. For example, the substrate layer 66 may be a woven fabric or non-woven fabric. In some embodiments, the thickness 68 of the substrate layer 66 may be approximately one to four millimeters.

Furthermore, in some embodiments, the filter membrane 32 may be chemically treated with one or more individual chemical treatments or a combined chemical treatment to increase the oil repellant and/or water repellant properties of the filter membrane 32 as well as the chemical resistivity of the filter membrane 32. For example, the filter membrane 32 may be treated with a fluorocarbon-based surfactant, a fluoroprotectant, a fluorinated copolymer, or a combination thereof. In certain embodiments, the filter membrane 32 may be treated with one or more treatments from the Zonyl family of products by Dupont of Wilmington, Del.

When the filter membrane 32 is placed into service, the dirty side 34 (e.g., the top layer 54) of the filter membrane 32 may be exposed to a number of contaminants. In automotive applications, for example, the dirty side 34 of the filter membrane 32 may be exposed to oil, gasoline, diesel fuel, exhaust, and so forth. Certain of these contaminants may have a tendency to build up inside the pores 50 of the filter membrane 32, thereby blocking the pores 50 and reducing the air flow through the filter membrane 32. However, as mentioned above, the transition layer 56 provides a layer of increased resistance to the flow of contaminants and thus reduces clogging of the filter membrane 32. In some embodiments, at least approximately 40, 50, 60, 70, or 80 percent of the original air flow through the filter membrane 32 will be maintained due to the anti-clogging properties of the filter membrane 32. The increased clogging resistance of the filter membrane 32 may be better understood with reference to FIGS. 5 and 6.

Figure 5:
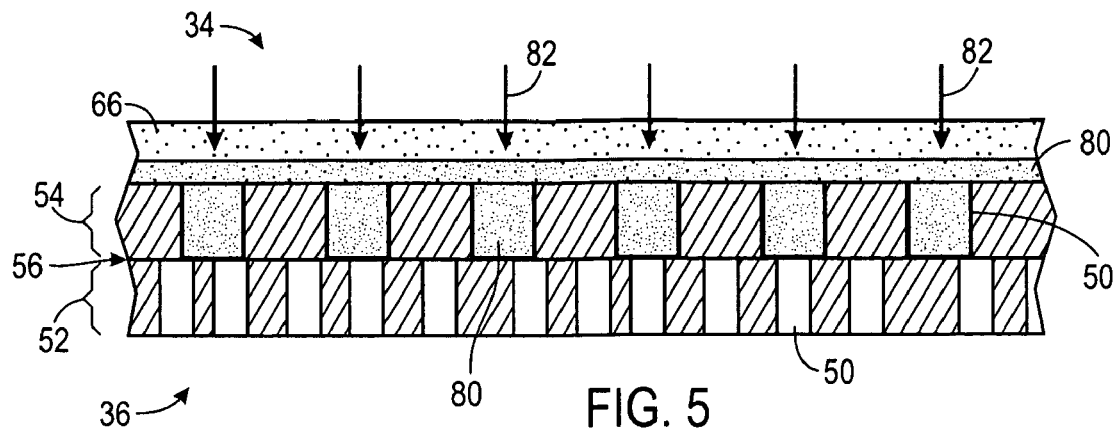
FIGS. 5 and 6 are cross-sectional views of the filter membrane of FIGS. 1-4, illustrating the anti-clogging effects of the filter membrane.
Figure 6:
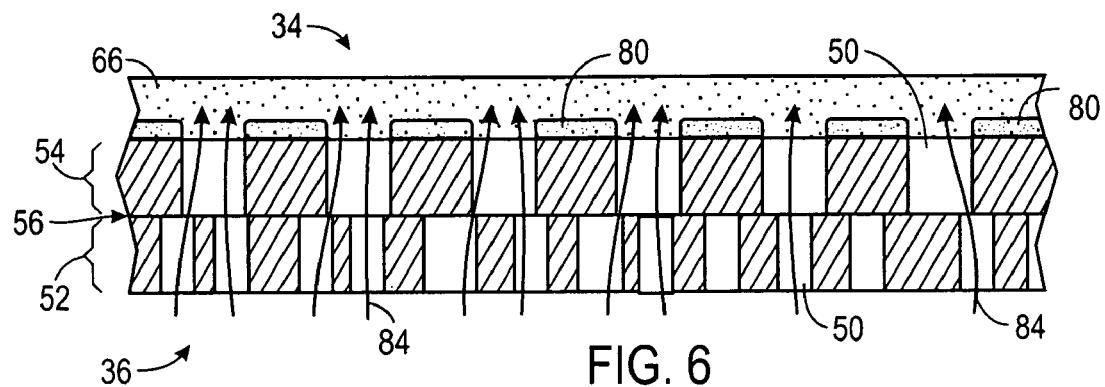

FIGS. 5 and 6 are cross-sectional views of the filter membrane 32 of FIGS. 1-4, illustrating the anti-clogging effects of the filter membrane 32, in accordance with an embodiment. Specifically, FIG. 5 illustrates the filter membrane 32 during a period of negative pressure (e.g., pressure on clean side 36 is less than dirty side 34) within the enclosure 10, and FIG. 6 illustrates the filter membrane 32 during a period of positive pressure (e.g., pressure on clean side 36 is greater than dirty side 34) within the enclosure 10. As shown in FIG. 5, the dirty side 34 of the filter membrane 32 may tend to collect a contaminant 80, which may be oil based, such as lubricating oil, gasoline or diesel fuel, for example. Although, the top layer 54 may tend to repel the contaminant 80, a limited amount of the contaminant 80 may become trapped within the pores 50 of the top layer 54 and build up over time. Additionally, if the pressure inside the enclosure 10 is negative, air pressure from outside of the enclosure 10, as indicated by the arrows 82, may tend to push the contaminant 80 deeper into the filter membrane 32. However, although the contaminant 80 may be absorbed into the pores 50 of the top layer 54, the transition layer 56 blocks the contaminant 80 from passing completely through the filter membrane 32 and contaminating the pores 50 of the bottom layer 52. Therefore, the bottom layer 52 of the filter membrane 32 remains relatively free of the contaminant 80.

Turning to FIG. 6, the filter membrane 32 is shown during a period of positive pressure within the enclosure 10. When the air pressure inside the enclosure 10 is positive, the air flow from inside the enclosure 10, as indicated by the arrows 84, may tend to force the contaminant 80 out of the filter membrane 32. Therefore, the pores 50 of the filter membrane 32 may tend to be cleared of the contaminant 80 each time the enclosure 10 experiences a period of positive pressure. The fact that the pores 50 of the bottom layer 52 remain relatively clear enables the positive air pressure to be more effectively focused on the contaminant 80 blocking the pores 50 of the top layer 54. In this way, the positive air flow 84 clears the contaminant 80 from the pores 50 of the top layer 54, and the top layer 54 will, therefore, be better able to pass air into the enclosure 10 during the next period of negative pressure. In certain embodiments, the filter membrane 32 may be subjected to pressures ranging between approximately 0 to 140 psi.

Figure 7:
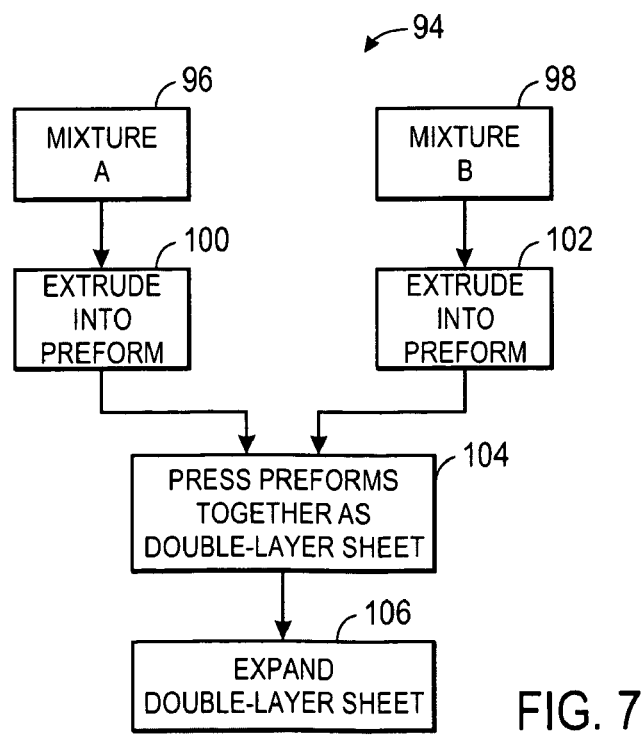
FIGS. 7-9 are flow charts of embodiments of methods of fabricating the filter membrane of FIGS. 1-6.
Figure 8:
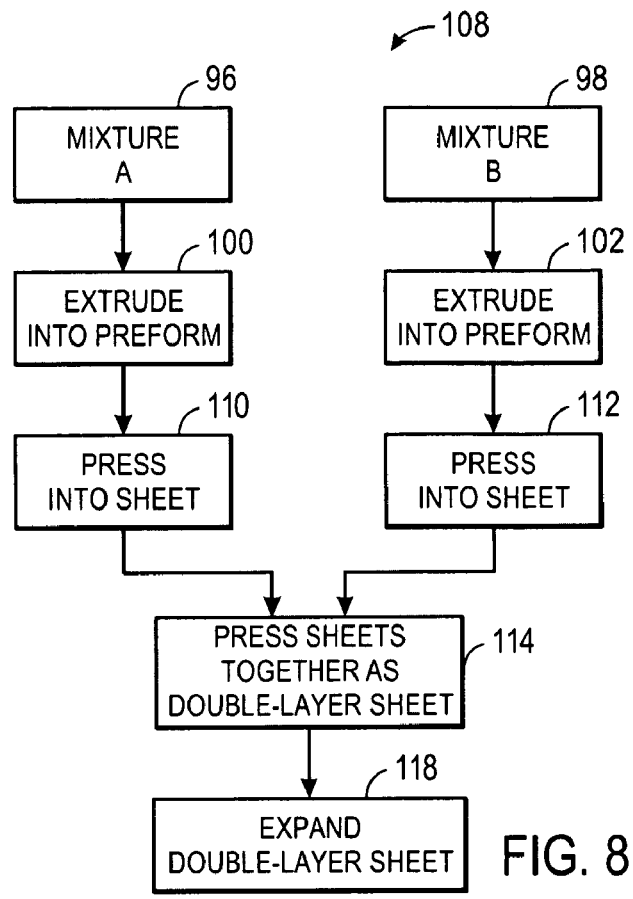
Figure 9:
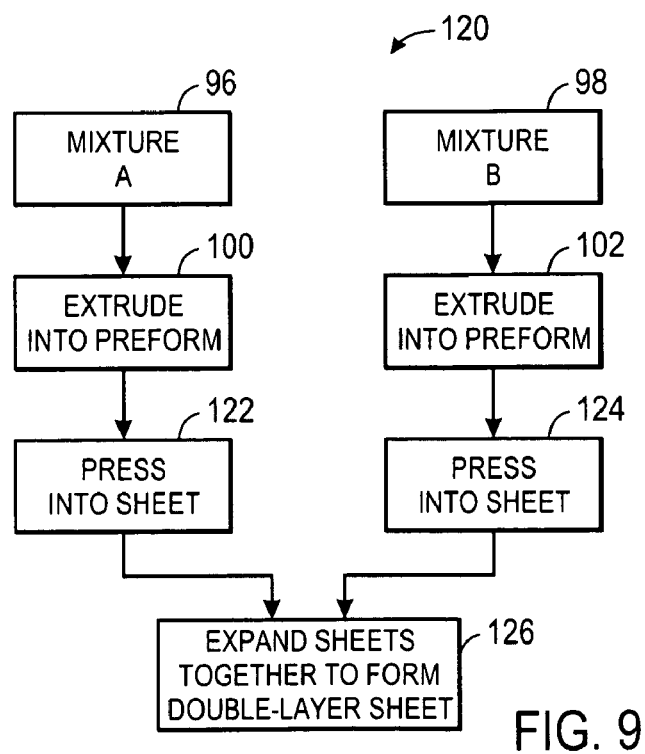

FIGS. 7-9 are flow charts of embodiments of processes of fabricating the filter membrane 32 of FIGS. 1-6. The fabrication methods provided herein describe methods wherein the layers 52 and 54 of the filter membrane 32 are co-stretched, e.g., coupled together before being stretched. The composite multilayer filter membrane 32 is then stretched to form the desired pore 50 sizes, as described above in reference to FIG. 4. Coupling the layers 52 and 54 prior to stretching, and then stretching the layers 52 and 54 simultaneously results in a simpler, less expensive, and faster production process. Furthermore, although techniques for producing a two layer membrane are described, it will be appreciated that the techniques described herein may be extended to provide a filter membrane 32 with 3, 4, 5, 6, 7 or more layers.

Turning first to FIG. 7, a first process 94 of fabricating a filter membrane 32 is shown. As shown in FIG. 7, process 94 begins with the preparation of two PTFE mixtures: mixture A at block 96 and mixture B at block 98. The pore diameters 62 and 64 may be controlled, in part, through the preparation of the PTFE mixtures. Moreover, due to the fact that the layers are stretched together to form the pores 50, the difference between the pore diameters 62 and 64 in the bottom and top layers 52 and 54 may be achieved through the proper preparation of the PTFE mixtures A and B, such that equal stretching of both layers 52 and 54 will create different pore diameters 62 and 64 in the layers 52 and 54. Accordingly, the compositions of mixture A and mixture B may be any suitable PTFE composition that results in differing pore diameters 62 and 64 in the bottom and top layers 52 and 54. For example, the mixtures A and B may have different amounts of lube agents or lubricating agents, which are mixed with the PTFE.

After preparing the PTFE mixtures, mixture A 96 and mixture B 98 may be extruded at blocks 100 and 102, respectively, forming two preforms of PTFE. Next, at block 104, both of the extruded preforms may be pressed and flattened to achieve a certain thickness. The pressing process forms a double-layer sheet of PTFE, the thickness of which may be controlled, in part, by the pressure applied to the two preforms. The above processes may produce significant amounts of heat in the PTFE sheet due to friction. Therefore, the equipment may also be configured to cool the double-layer sheet of PTFE during processing.

Next, at block 106, the double-layer sheet of PTFE may be expanded, i.e. stretched, to form the pores 50. The expansion of the double-layer PTFE sheet may be controlled to determine the desired pore diameters 62 and 64 on the bottom 52 and top 54 layers. However, as stated above, the relative difference between the pore diameters 62 and 64 on the bottom 52 and top 54 layers may be substantially or entirely based on steps 96 and 98, wherein the PTFE mixtures A and B were prepared. In various embodiments, the double-layer PTFE sheet may be expanded longitudinally (i.e. relative to the length of sheet), laterally (i.e. relative to the width of the sheet), or both. After the double-layer sheet of PTFE is expanded at block 106, the substrate layer 66 may be added to form the filter membrane 32. In certain embodiments, the expansion step 106 may provide an expansion of approximately 10 to 70 percent. For example, the expansion step 106 may provide an expansion of at least greater than approximately 10, 20, 30, 40, 50, 60, 70, or greater percent.

Turning now to FIG. 8, a second process 108 of fabricating a filter membrane 32 is shown. As in process 94 of FIG. 7, process 108 of FIG. 8 also begins with the preparation of two PTFE mixtures: mixture A at block 96 and mixture B at block 98, and extrusion of two PTFE preforms at blocks 100 and 102. However, rather than pressing the two billets together, as in FIG. 7, in process 108, each billet is pressed separately at blocks 110 and 112, respectively forming two PTFE sheets. After the pressing steps of blocks 110 and 112, the PTFE sheets may be wet. Next, at block 114, the two PTFE sheets may be pressed together while the PTFE sheets are still wet, forming a double layer PTFE sheet. Next, at block 118, the double-layer PTFE sheet is expanded, as described above in relation to FIG. 7. After the double-layer sheet of PTFE is expanded at block 118, the substrate layer 66 may be added to form the filter membrane 32.

Turning now to FIG. 9, a third process 120 of fabricating a filter membrane 32 is shown. As in process 94 of FIG. 7 and process 108 of FIG. 8, process 120 also begins with the preparation of two PTFE mixtures: mixture A at block 96 and mixture B at block 98, and extrusion of two PTFE preforms at blocks 100 and 102, respectively. Each preform may then be pressed separately at blocks 122 and 124, respectively forming two PTFE sheets. After pressing, the two PTFE sheets may then be dried. Next, the two dried PTFE sheets may be expanded together at block 126, forming a double-layer sheet of ePTFE. In this embodiment, sufficient pressure is applied during the expanding process to adhere the two PTFE sheets to one another. After the double-layer sheet of PTFE is expanded at block 126, the substrate layer 66 may be added to form the filter membrane 32. The foregoing conditions of process 120 provide a permanent mechanical bond between the sheets.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    bonding a plurality of layers, wherein the plurality of layers comprises a first porous polymer layer, a second porous polymer layer, and a transition bond between the first and second porous polymer layers; and
    co-stretching the plurality of layers, including the first and second porous polymer layers and the transition bond after bonding, to form a stretched filter membrane having porosities that change from one layer to another, wherein a first plurality of pores of the first porous polymer layer is misaligned with a second plurality of pores of the second porous polymer layer along the transition bond to define a pore misalignment, and the pore misalignment is configured to change a direction of flow and block passage of a contaminant between the first and second porous polymer layers.

2. The method of claim 1, wherein bonding comprises fixing together faces of the plurality of layers without prior stretching of the layers.

3. The method of claim 1, wherein the plurality of layers comprises a plurality of PTFE layers, the first porous polymer layer comprises a first PTFE layer, and the second porous polymer layer comprises a second PTFE layer.

4. The method of claim 1, wherein bonding comprises directly bonding the first and second porous polymer layers together by thermally bonding or chemically bonding the first and second porous polymer layers to define the transition bond.

5. The method of claim 1, wherein co-stretching comprises stretching the plurality of layers, after bonding, by at least approximately 20 percent.

6. The method of claim 1, comprising:
preparing a first polymer mixture configured to provide a first pore size for the first porous polymer layer;
preparing a second polymer mixture configured to provide a second pore size for the second porous polymer layer;
extruding the first polymer mixture into a first preform;
extruding the second polymer mixture into a second preform separate from the first preform, wherein the first and second preforms are not sheets;
pressing the first preform and the second preform together into a double-layered polymer sheet; and
co-stretching the double-layered polymer sheet to form the stretched filter membrane comprising the first porous polymer layer that includes pores of the first pore size and the second porous polymer layer that includes pores of the second pore size.

7. The method of claim 1, comprising:
preparing a first polymer mixture configured to provide a first pore size for the first porous polymer layer;
preparing a second polymer mixture configured to provide a second pore size for the second porous polymer layer;
forming the first polymer mixture into a first sheet corresponding to the first porous polymer layer;
forming the second polymer mixture into a second sheet corresponding to the second porous polymer layer, wherein the second sheet is separate from the first sheet; and
simultaneously pressurizing and co-stretching the first sheet together with the second sheet to form the stretched filter membrane comprising the first porous polymer layer that includes pores of the first pore size and the second porous polymer layer that includes pores of the second pore size, wherein the transition bond is formed while simultaneously pressurizing and co-stretching the first sheet together with the second sheet.

8. The method of claim 1, comprising treating the stretched filter membrane with at least one treatment to increase oil repellency and water repellency, and the at least one treatment comprises a fluorocarbon-based substance.

9. A method, comprising:
filtering a substance in a medium flowing through a stretched filter membrane having a plurality of co-stretched layers, wherein the plurality of co-stretched layers comprises a first porous polymer layer comprising a first plurality of pores with a first average pore diameter, a second porous polymer layer comprising a second plurality of pores with a second average pore diameter different than the first average pore diameter, and a transition bond between the first and second porous polymer layers; and
blocking the substance at the transition bond between the first and second porous polymer layers, wherein the first plurality of pores is misaligned with the second plurality of pores along the transition bond to define a pore misalignment, and the pore misalignment is configured to change a direction of flow.

10. The method of claim 9, comprising reversing flow of the medium, or a different medium, through the stretched filter membrane to clean out the substance blocked by the transition bond.

11. A system, comprising:
a filter membrane, comprising:
a first porous polymer layer comprising a first plurality of pores with a first average pore diameter;
a second porous polymer layer comprising a second plurality of pores with a second average pore diameter different than the first average pore diameter;
a transition layer co-stretched between the first and second porous polymer layers, wherein the first plurality of pores is misaligned with the second plurality of pores along the transition layer to define a pore misalignment, the pore misalignment is configured to change a direction of flow, and the transition layer with the pore misalignment is configured to block a flow of contaminants between the first and second porous polymer layers.

12. The system of claim 11, wherein the first and second average pore diameters are both less than approximately 10 microns, and the second average pore diameter is at least less than approximately 50 percent of the first average pore diameter.

13. The system of claim 11, wherein the filter membrane is disposed over an opening of an enclosure supporting electronics, the filter membrane comprises at least one treatment to increase oil repellency and water repellency, and the at least one treatment comprises a fluorocarbon-based substance.

14. The system of claim 11, wherein the first and second porous polymer layers comprise PTFE.

15. The method of claim 1, wherein the pore misalignment is at least 10 percent misalignment between the first plurality of pores and the second plurality of pores.

16. The method of claim 1, wherein the pore misalignment is at least 50 percent misalignment between the first plurality of pores and the second plurality of pores.

17. The method of claim 1, wherein the first porous polymer layer comprises a first PTFE layer, the second porous polymer layer comprises a second PTFE layer, the pore misalignment is at least 10 percent misalignment between the first plurality of pores and the second plurality of pores, the stretched filter membrane comprises at least one treatment to increase oil repellency and water repellency, a first average pore diameter of the first plurality of pores and a second average pore diameter of the second plurality of pores are both less than approximately 10 microns, and the second average pore diameter is at least less than approximately 80 percent of the first average pore diameter.

18. The method of claim 9, wherein the first porous polymer layer comprises a first PTFE layer, the second porous polymer layer comprises a second PTFE layer, the pore misalignment is at least 10 percent misalignment between the first plurality of pores and the second plurality of pores, the stretched filter membrane comprises at least one treatment to increase oil repellency and water repellency, the first and second average pore diameters are both less than approximately 10 microns, and the second average pore diameter is at least less than approximately 80 percent of the first average pore diameter.

19. The system of claim 11, wherein the pore misalignment is at least 10 percent misalignment between the first plurality of pores and the second plurality of pores.

20. The system of claim 11, wherein the pore misalignment is at least 50 percent misalignment between the first plurality of pores and the second plurality of pores.

* * * * *